United States Patent [19]

Eaton

[11] Patent Number: 4,588,466

[45] Date of Patent: May 13, 1986

[54] TAPE LAYING METHOD AND APPARATUS

[75] Inventor: Homer L. Eaton, Leucadia, Calif.

[73] Assignee: Vektronics Manufacturing, Inc., Carlsbad, Calif.

[21] Appl. No.: 512,406

[22] Filed: Jul. 8, 1983

Related U.S. Application Data

[63] Continuation-in-part of Ser. No. 483,293, Apr. 8, 1983, Pat. No. 4,491,493.

[51] Int. Cl.$^4$ .................................................. B44C 31/00
[52] U.S. Cl. ................................ 156/235; 156/250; 156/358; 156/361; 156/502; 156/521; 156/540
[58] Field of Search ............... 156/235, 250, 353, 358, 156/505, 361, 363, 510, 521, 522, 540, 541, 502; 242/55; 221/73

[56] References Cited

U.S. PATENT DOCUMENTS

| 3,457,137 | 7/1969  | McCarthy       | 161/116 |
|-----------|---------|----------------|---------|
| 3,574,040 | 4/1971  | Chitwood et al.| 156/522 |
| 3,765,992 | 10/1973 | Stageberg      | 156/521 |
| 3,775,219 | 11/1973 | Karlson et al. | 156/363 |
| 3,783,783 | 1/1974  | Hamisch        | 101/226 |
| 3,810,805 | 5/1974  | Goldsworthy et al. | 156/361 |
| 3,996,089 | 12/1976 | More et al.    | 156/235 |
| 4,133,711 | 1/1979  | August et al.  | 156/353 |
| 4,174,237 | 11/1979 | Hemming, Jr. et al. | 156/64 |
| 4,208,238 | 6/1980  | August et al.  | 156/510 |
| 4,285,752 | 8/1981  | Higgins        | 156/250 |
| 4,292,108 | 9/1981  | Weiss et al.   | 156/259 |
| 4,317,695 | 3/1982  | Madhu et al.   | 156/353 |
| 4,351,688 | 9/1982  | Weiss et al.   | 156/358 |
| 4,369,082 | 1/1983  | Kerwin         | 156/541 |

OTHER PUBLICATIONS

Report Prepared by General Dynamics for the U.S. Government Entitled "Prototype Tape Laying Machine GDTL-1", pp. 3, 47, 55–68, 74, 75, 82, 89, 95, 104 & 107.

Primary Examiner—Jay H. Woo
Assistant Examiner—Timothy W. Heitbrink
Attorney, Agent, or Firm—Gausewitz, Carr and Rothenberg

[57] ABSTRACT

Improved laying of high strength composite tape is achieved by stretching a strip of tape entirely across the area on which the tape is to be laid before pressing any part of the tape against the work surface, and then pressing the tape against the surface while the tape is stretched across and adjacent the work surface. The tape is held and stretched across the work surface on supply and takeup reels on opposite sides of the work surface, so that the reels need not move along the tape with the moving pressure foot. The pressure foot and both reels are mounted for independent motion completely around the work surface to enable tape strips to be laid in all directions across the work surface without rotating the work surface.

37 Claims, 18 Drawing Figures

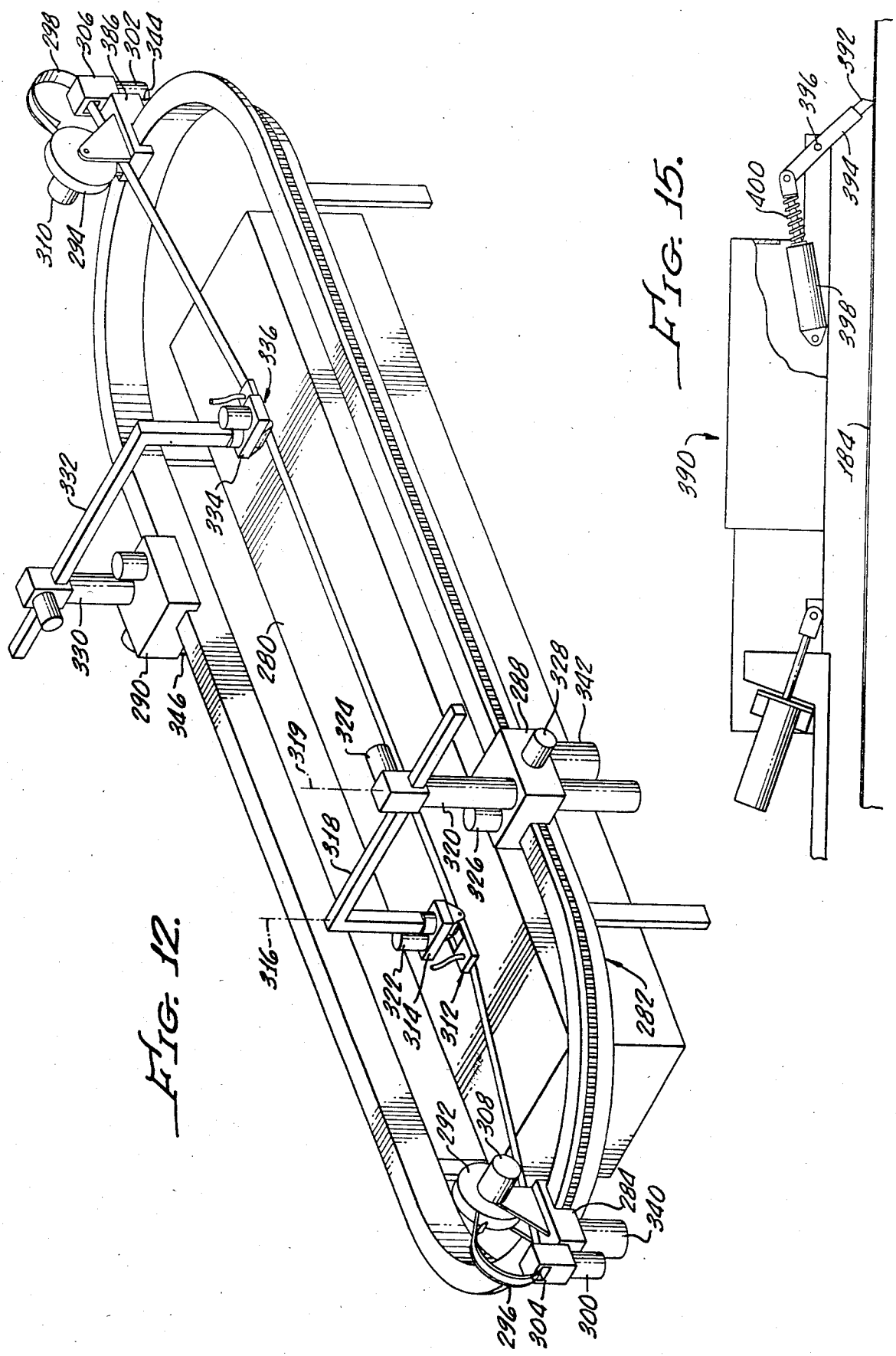

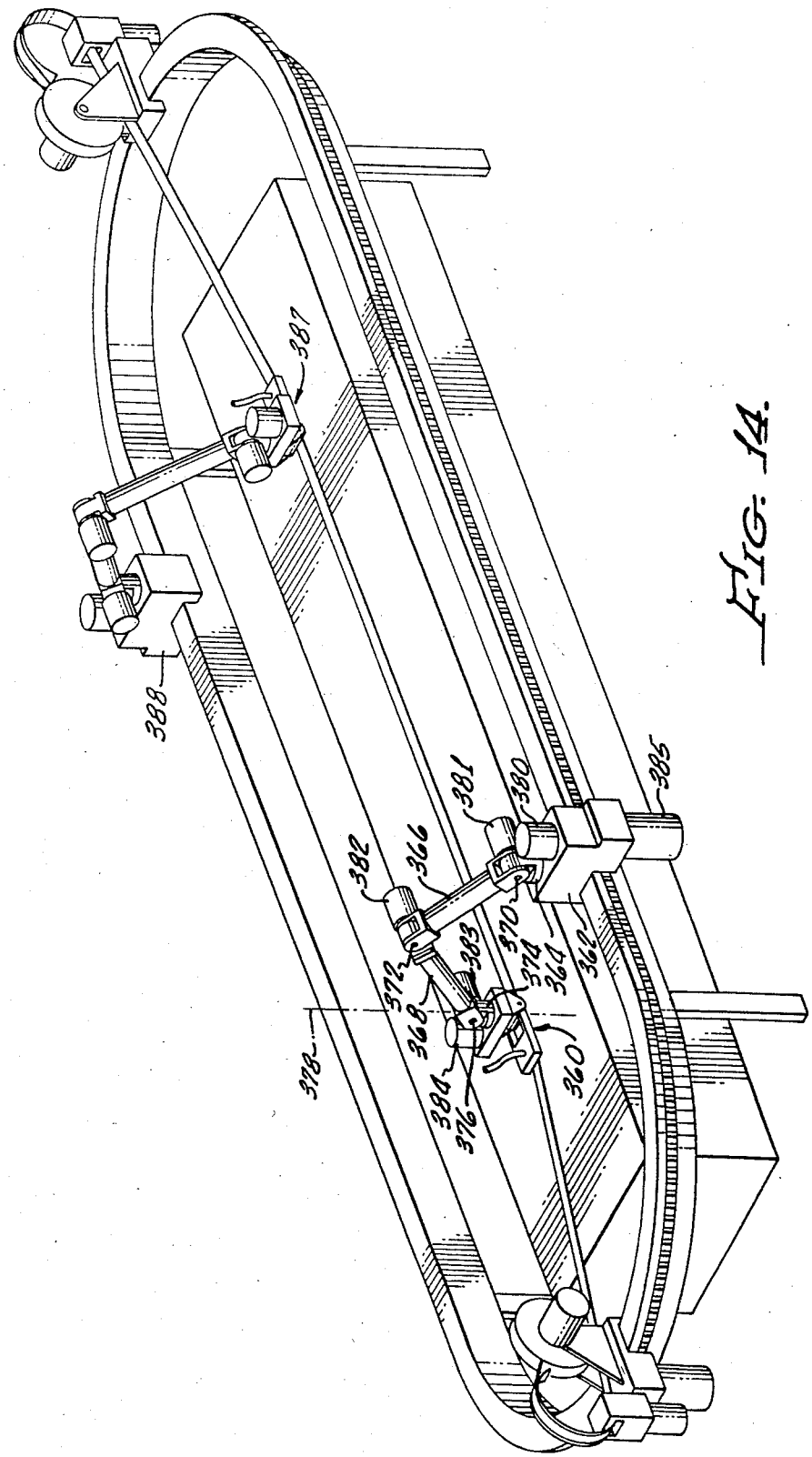

TAPE LAYING METHOD AND APPARATUS

This application is a continuation-in-part of my application Ser. No. 483,293 filed Apr. 8, 1983 now U.S. Pat. No. 4491493 for Tape Application Method and Apparatus. The disclosure of said application is incorporated by this reference as though fully set forth herein.

The present invention relates to the application of high strength composite tape and more particularly concerns methods and apparatus for laying of composite tape.

BACKGROUND OF THE INVENTION

Composite fiber tape formed of high tensile strength fibers of materials such as boron, graphite, or glass, and impregnated with a matrix of a thermosetting resin, has been employed for a number of years in the manufacture of laminated composite structural shapes for aircraft and aerospace vehicles. Frequently the fibers are all mutually parallel and run longitudinally along the tape. However such composite tape is also available with fibers running transversely or obliquely with respect to the length of the tape. Such oblique fiber tape may be a strip cut on a bias from a wider sheet of composite material. Composite tape structural parts are commonly made by superposing many laminations with different tape or fiber orientations, each lamination made by laying down strips of composite tape, generally in a side-by-side relation upon a pattern or form. Successive and superposed strips and layers will have different fiber orientations. Tape and fiber orientations are chosen to obtain advantage of the high strength characteristics of the fiber. The many laminations are placed in a mold and heated to cure the resin and provide the finished part. Much time, effort, and expense has been devoted to the fabrication of automatic machines for the laying of individual strips of tape. Examples of such tape laying machines are shown in U.S. Pat. Nos. 3,574,040; 3,775,219; 3,810,805; 4,133,711; and 4,292,108.

These machines generally involve an overhead gantry from which is suspended a laterally traveling tape laying head which often carries tape supply and take up reels, guiding mechanisms, cutting mechanisms, a heater, and a tape pressure foot. The tape laying head does all the tape preparation, in addition to pressing the tape upon a work surface. In the head mechanism, tape is withdrawn from a supply reel carried by the mechanism, and cut into predetermined strip lengths as it is applied to a work surface. The composite tape, having an exceedingly high modulus of elasticity, is stiff, inelastic, and difficult to handle. The tape head laying machine is massive, expensive, slow, and complex, and, in some cases, may comprise a structure in the order of one to two feet in diameter and four to six feet in height. All of this structure must be movably mounted on a gantry and controlled for guiding the tapes in precise, aligned side-by-side paths.

An additional problem exists in the laying of tape upon a surface of compound curvature. To properly fit a compound curve, the individual tape fibers, running longitudinally of the tape, must slip longitudinally relative to one another, because those fibers extending over a path of greater curvature must have a greater length than adjoining fibers of the same tape strip that extend over a path of lesser curvature. However, where the tape supply reel is carried by the tape laying machine, and, in particular, where a long strip of tape is not cut until after a portion of the same strip has been laid, no relative slippage of tape fibers is possible.

Imperfections in the manufacture of the tape, or damage to the tape during handling, can be discovered in prior art machines only after the tape has been pulled out of the tape laying machine and at least partly laid upon the work surface. Therefore, a damaged tape strip can be replaced only after it has been laid, a situation that increases cost and time of manufacture, particularly where a damaged strip of tape of many feet or many tens of feet in length must be removed after it has been laid.

Speed of the tape laying operation and application to manufacture of parts of varying configurations are limited by the mounting of tape reels and tape pressure rollers all on the same massive head. The machine gantry must be at least as long as the longest tape path, and thus use for very long parts is not practical.

Accordingly, it is an object of this invention to avoid or minimize above-mentioned problems.

SUMMARY OF THE INVENTION

In carrying out principles of the present invention in accordance with a preferred embodiment thereof, an improved method of laying the tape comprises stretching a strip of tape adjacent a work surface between first and second boundaries of a pattern on the work surface, with one end of the strip at one boundary, and pressing one end of the strip against the surface along a pressure area of the tape strip. The pressure area is then moved along the tape strip while holding the strip stretched across and adjacent the work surface area. In a modification of this method, the tape pressure area is moved from an intermediate point of the tape outwardly toward opposite ends of the tape to facilitate laying the tape on a curved surface and to facilitate fiber slippage.

Tape laying apparatus embodying principles of the invention comprises supply and takeup reel receiving devices mounted for motion relative to a work table. A tape laying pressure head is mounted for independent motion between the receiving devices adjacent the work table, and includes means for pressing composite tape and its carrier belt against the work table while the head is driven toward a receiving device.

According to a feature of the invention, first and second carriages for the tape reel receiving devices or other working heads are mounted on a track that extends around the work table so that the two working heads can be aligned on lines extending across the table in any orientation. One or more additional working heads, such as a tape pressure head, may be mounted on other carriages adjacent the table and some or all of the carriages independently positioned. One or more of the working heads, such as the tape heads, may be supported on their carriages by interconnected movable arms to shift such heads to different positions and orientations relative to the supporting carriage.

According to another feature of the invention, the tape laying head of the apparatus includes a gripping and lifting roller, which may grip the tape while it is being pulled out to position, and which will separate the carrier belt or paper backing from the tape.

BRIEF DESCRIPTION OF THE DRAWINGS

FIG. 12 shows a modified form of tape laying apparatus;

FIG. 14 shows a modification of the system of FIG. 12;

FIG. 15 shows a retractable cutter mounted on the tape head;

DETAILED DESCRIPTION OF THE INVENTION

Figure 1:
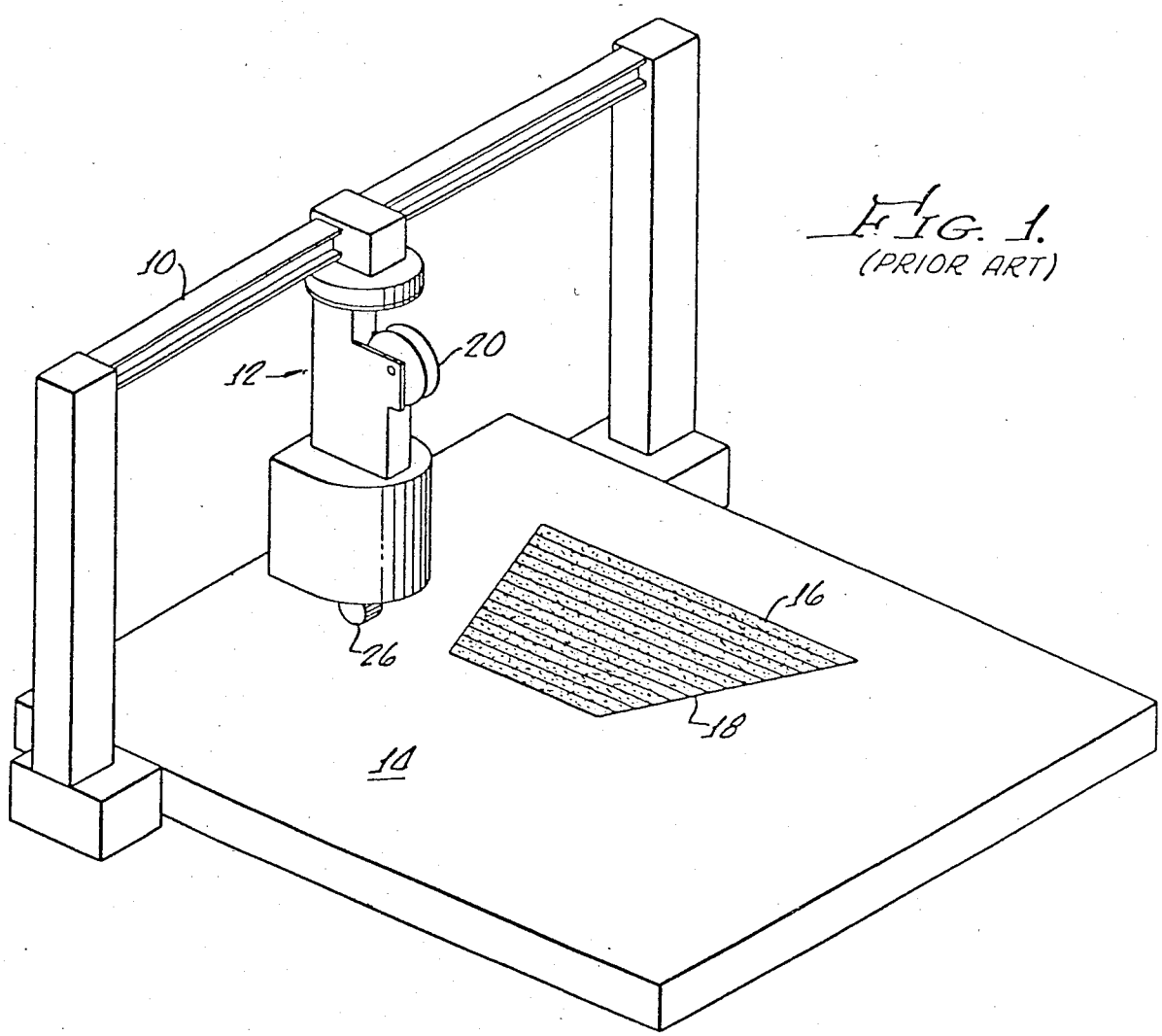
FIGS. 1 and 2 illustrate a prior art integral tape laying head.
Figure 2:
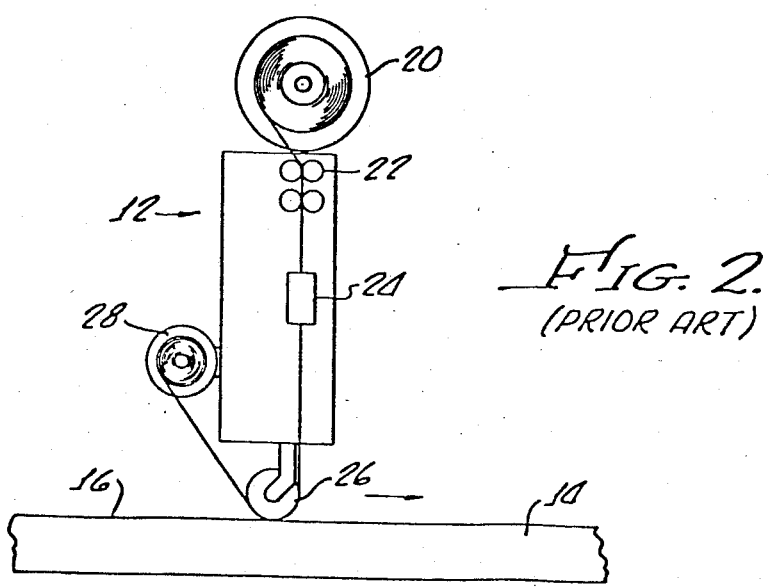
Figure 18:
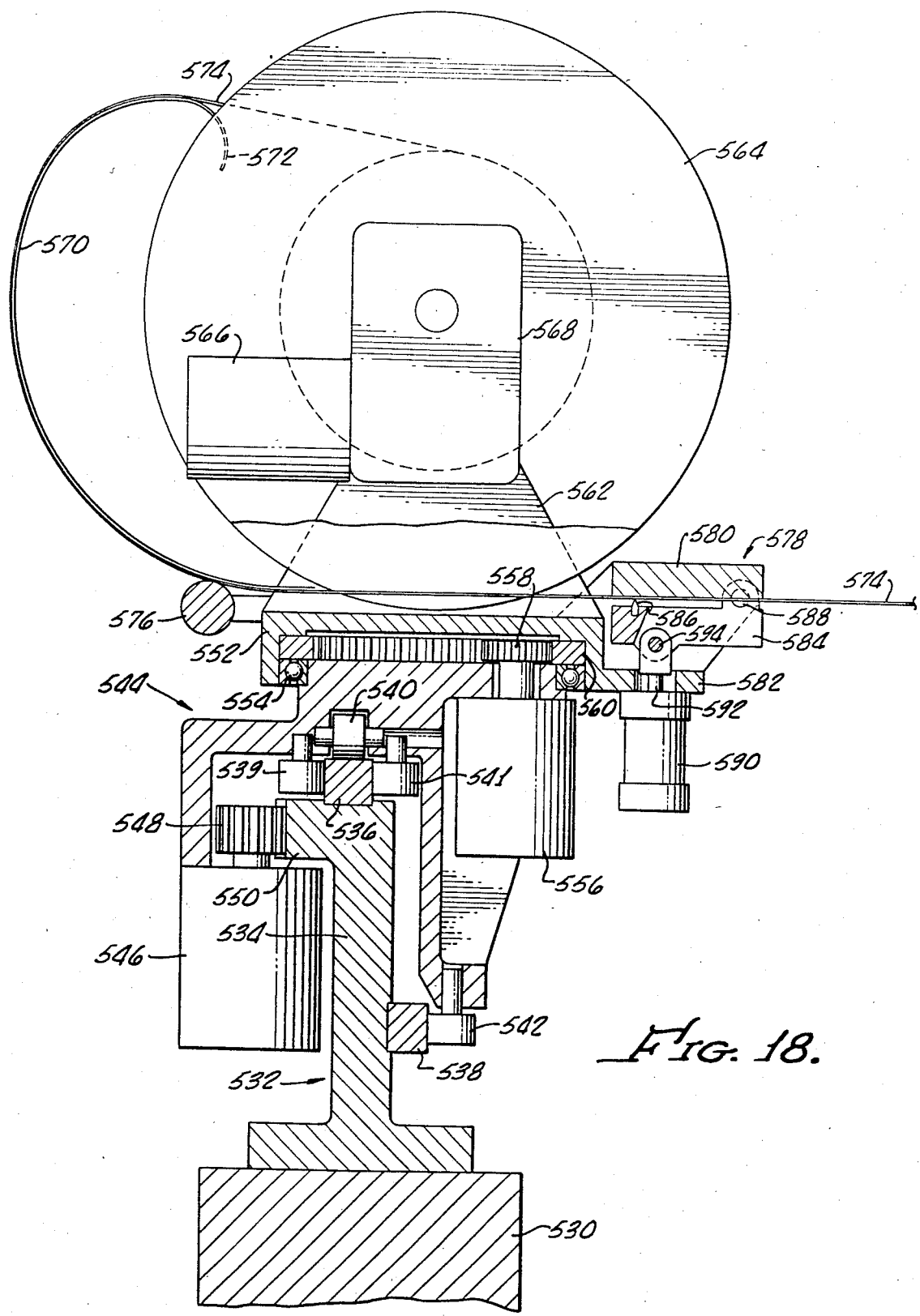
FIG. 18 shows details of a carriage and reel mounting.

As shown in FIG. 1, an exemplary prior art machine involves a gantry 10, carrying an integral tape head laying machine 12, mounted for travel along the length of the gantry above a table 14 on which is to be laid a layer of side by side tape strips 16 in a pattern, generally indicated as the trapezoidal FIG. 18. The table and gantry are relatively moved along the length of the strips 16 during the laying of each individual strip. To lay successive strips, the integral head 12 is shifted laterally with respect to the table along the gantry 10. As schematically shown in FIG. 2, the integral tape laying head includes a tape supply reel 20, driving rollers 22, a cutting station 24, a tape pressure roller 26, and a take up reel 28 for winding up backing paper that is removed from the composite tape. Supply reel 20 stores a roll of composite tape mounted upon a paper backing ribbon. Tape and backing are drawn from the supply reel 20 and passed through and under the pressure roller 26, while the integral tape head is moved relative to the table and relative to the pattern in the direction of the arrows shown in FIGS. 2 and 3. Initially, the tape roller 26 is positioned over the end 32 of a first path 30 and will travel to the far end 34. At some time before reaching the far end 34, the trailing edge of the tape strip being laid on path 30 is cut by the integral tape head cutters. Upon reaching the end of path 34, the integral tape head is raised, rotates 180°, and then proceeds in the opposite direction along the adjoining tape laying path 36. This machine is bidirectional, laying successive tape strips in two directions. It is large, complex, costly, and difficult to control, requiring large fixed gantry and track structures, and yet is not feasible for use on long narrow parts such as an airplane wing because of the large complex structure that must repeatedly traverse the length of the part.

Figure 4:
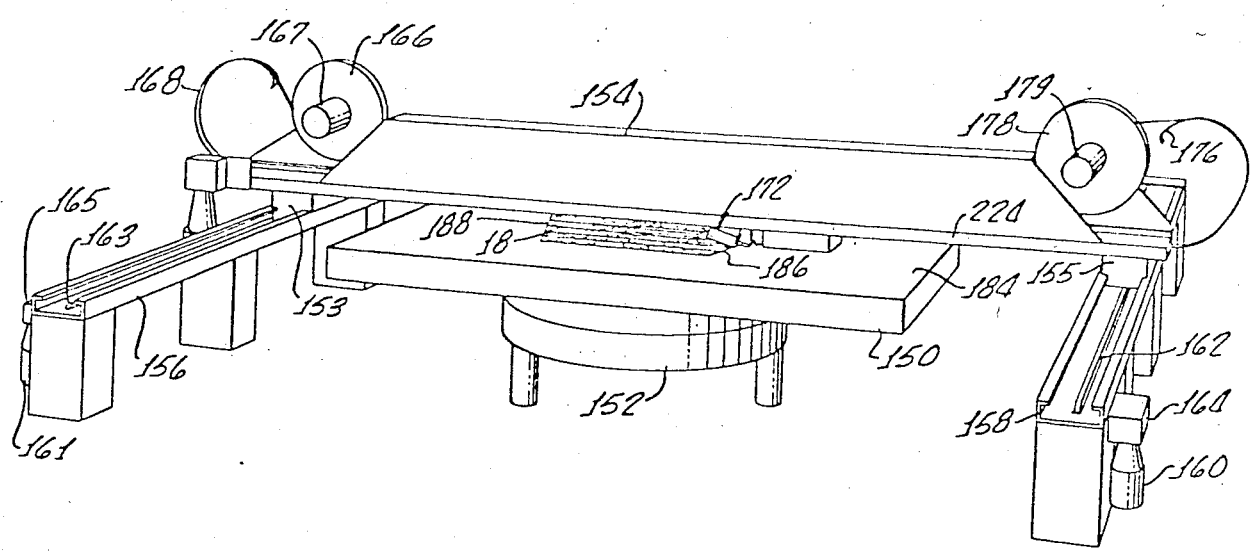
FIG. 4 is a pictorial illustration of a tape pullout and laying machine embodying principles of the present invention.
Figure 5:
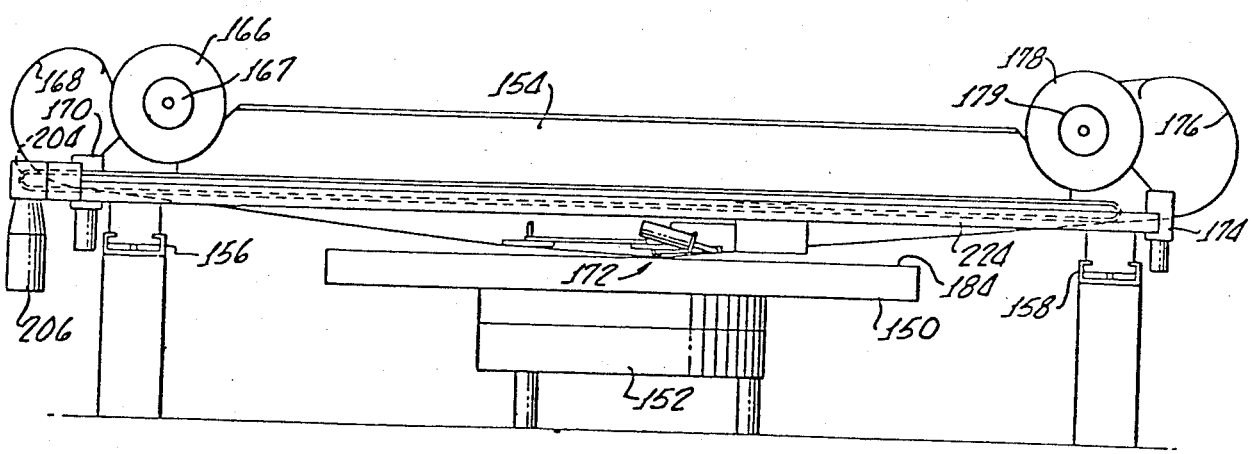
FIG. 5 is an elevational side view of the machine of FIG. 4.
Figure 6:
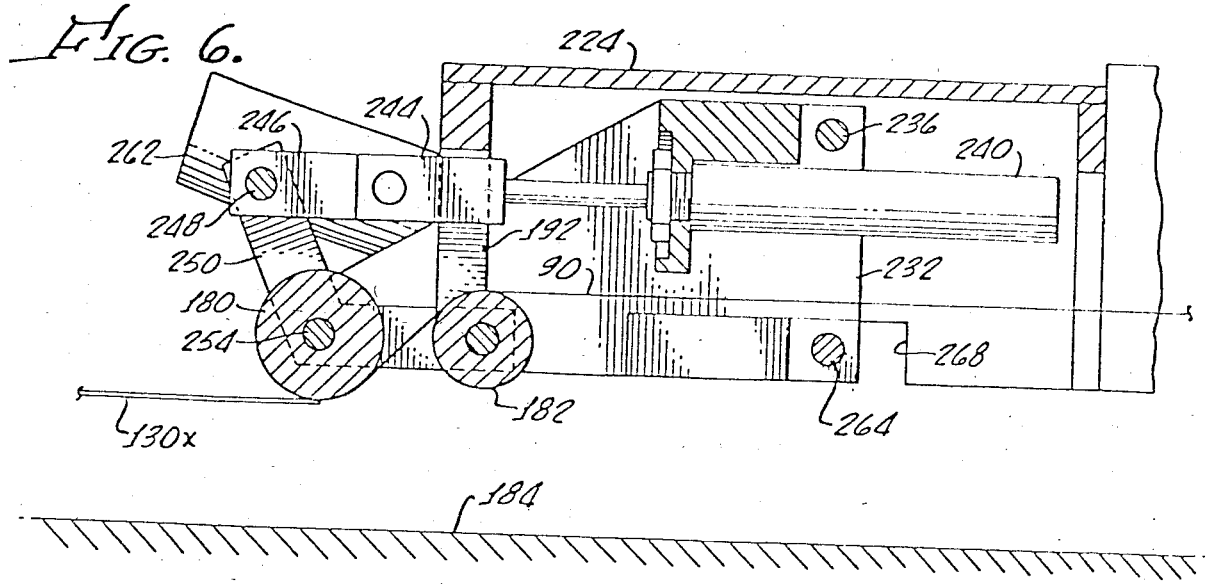
FIGS. 6, 7 and 8 illustrate three modes of operation of the machine of FIGS. 4 and 5, showing certain details of the tape laying head structure.
Figure 7:
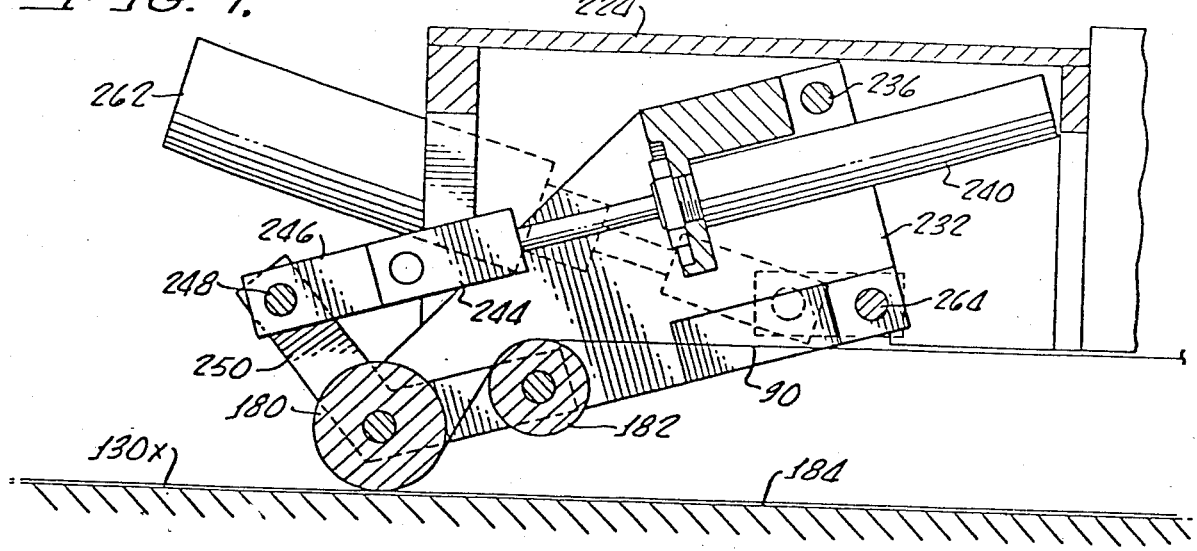

Illustrated in FIGS. 4 and 5 is a unidirectional tape laying apparatus that avoids many problems of the prior art. This apparatus embodies supply and takeup reels that are positioned at opposite ends of a given tape strip path and a shuttle-type tape head which reciprocates back and forth between the reels across a work surface. The apparatus can use conventionally prepared composite tape or pre-cut tape strips that are mounted and longitudinally pre-assembled on a ribbon of backing paper or carrier belt in longitudinally spaced relation. If adjacent ends of successive tape strips are cut at an acute angle to their length and spaced from one another on the carrier belt, the trailing edge of one strip can be pressed closely upon the work table without pressing the leading edge of the next strip. Further details of such pre-cut and pre-assembled tape strips and carrier belt, and apparatus for its assembly are disclosed in the above-mentioned application Ser. No. 483,293.

A rotatable work table 150 is mounted on a fixed base 152 beneath a traveling gantry 154, the ends of which are mounted on carriages 153,155 which are guided to travel in transverse tracks 156,158 at opposite sides of table 150. The table is mounted for 360° rotation about a vertical axis between the tracks. Carriage 155 is driven laterally of the table 150 and along the length of track 158 by a motor 160 driving an endless chain 162 via a gear box and sprocket 164, the endless chain being connected at its opposite ends to opposite sides of the end of the carriage. A similar motor chain drive and gear box 161, 163, 165 for the carriage at the other end of the gantry is provided and may be synchronized with the drive of the first end. Independent drive of the carriages and mounting the gantry ends for pivotal motion about vertical axes enables a relatively small amount of variation of the orientation of the tape laying path without rotation of the table. The tracks may be translated or pivoted toward and away from each other to cooperate with the pivoting of the gantry.

Mounted at one end of the gantry on carriage 153 is a supply reel 166 which may include a composed preassembly of carrier belt and pre-cut, longitudinally spaced tape strips mounted on the belt, or a continuous uncut length of tape. The tape and belt are wound with the tape relatively inwardly and the belt relatively outwardly, so that the winding of the belt helps to maintain the much stiffer tape in its wound condition. Tape from supply reel 166 is drawn off over a low mass, lightweight, curved tensioning spring 168 and fed through a cutting station 170, which may be employed if pre-cut tape strips are not used for supply reel 166. The tape cutter is preferably arranged to precisely limit blade travel so as to cut through the tape but not its backing. A disposable backing of a conventionally prepared continuous and uncut tape requires use of such a cutter, whereas precut and pre-assembled tape and carrier belt needs no cutter on the tape laying apparatus. When withdrawn, the tape faces downwardly, being positioned between the belt and the work surface. The wound tape or, more specifically, the carrier belt upon which the tape is wound, is passed through a shuttle-type tape laying head 172 which is slidably mounted for reciporcation along the length of gantry 154, and thence past a clamp 174 at the other end of the gantry. From the clamp, the carrier belt extends around a second low mass, light-weight, curved tensioning spring 176 to be wound upon a take up reel 178 mounted on the carriage 155 at the other end of the gantry. The supply and take up reels are driven by bi-directional drive motors 167, 179, respectively.

Figure 8:
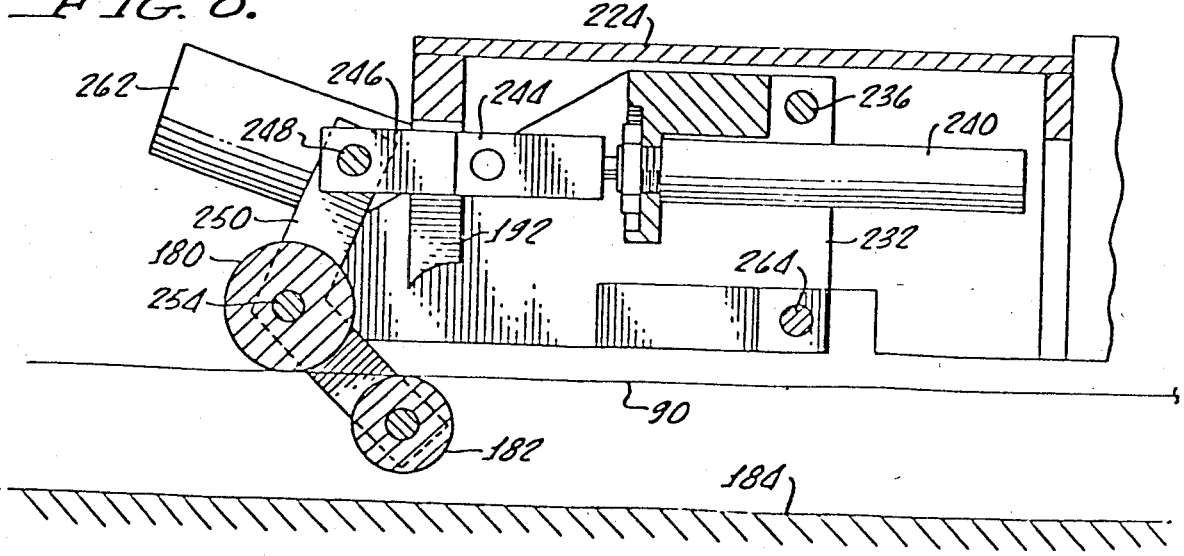

Tape head 172, more particularly illustrated in FIGS. 6 through 10, carries a movably mounted and driven pressure roller 180 and a belt lifting roller 182. These rollers are driven to three different positions (FIGS. 6, 7, and 8) for operation of the tape head in three different modes. In each mode a carrier belt 90 and a tape strip 130x, for example, pass through the tape head, below the pressure roller 180, and above the lifting roller 182. In pass mode, illustrated in FIG. 8, the pressure roller is raised above the surface 184 of worktable 150. Lifting roller 182 is also raised above the surface, but is considerably below the pressure roller so that the tape and belt, or more specifically, the belt alone, can be readily passed between the two rollers. The pass mode is used for initially (manually) loading the tape which is first drawn from the supply reel 166, around the tension spring and through the cutting station 170, if any, and then threaded between the two rollers 180, 182, as illustrated in FIG. 8, to be attached to and initially wound upon take up reel 178.

Figure 3:
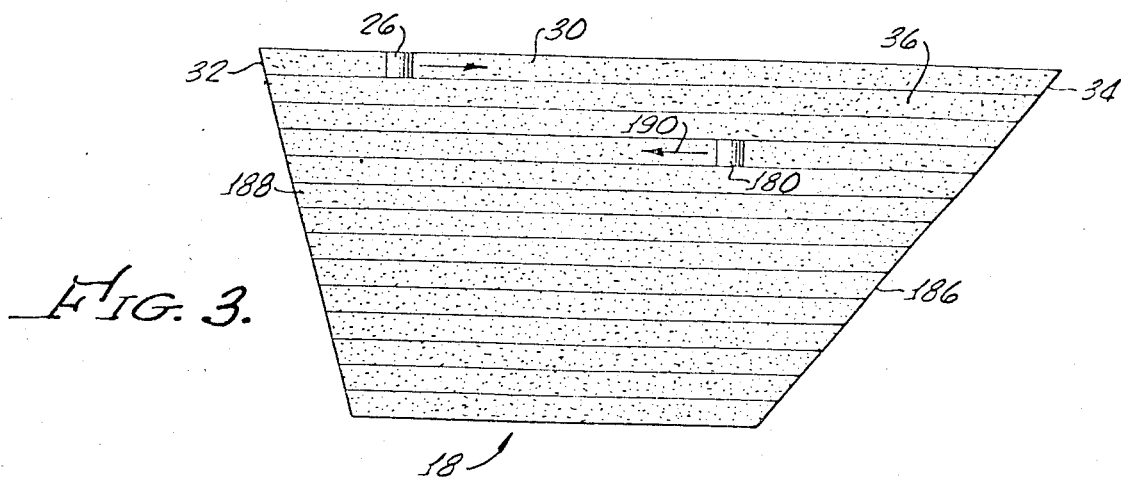
FIG. 3 illustrates a layer of tape strips and motion of a tape head.

In the pass mode, the leading section of the belt (which has no tape) is manually pulled between the two rollers until the leading edge of the first tape strip 130X is directly beneath the pressure roller 180. Assume that successive strips of tape are to be laid between boundaries 186 and 188 that define two sides of the pattern 18 upon worktable 150 with the tape to be laid in parallel strips from boundary 186 to 188 (FIGS. 3 and 4). The head initially is positioned somewhere to the left of the first or lead boundary 186. The head will first pull out and position a first tape strip and then will move from the first boundary 186 along a predetermined path, defined by the gantry position, to the second boundary 188 during the tape laying operation. With the leading edge of the fiber tape strip 130x positioned initially on the carrier belt somewhere to the left of the pattern 18, the tape head is moved in the pass mode until the pressure roller 180 is directly over the leading edge of tape strip 130X, at which time the head is moved into the pull mode (FIG. 6) in which the lifting roller 182 is pivoted upwardly relative to the pressure roller (which remains above the worktable). The lifting roller in pull mode is pressed against a clamp 192 (with belt 90 interposed), and the tape head is moved to the right, while the take up reel is driven to wind up the carrier belt, and the supply reel is driven to unwind the supply of belt and tape.

In pull mode, the tape head is moved to position the leading edge of the cut tape strip directly above the first boundary 186 and the tape head then is driven to its lay mode (FIG. 7) in which the pressure roller 180 is driven downwardly to press againt the carrier belt, thereby to press the underlying tape at its leading edge against the surface of the work table precisely at or close to the first boundary 186. The lifting roller 182 in lay mode is still below the carrier belt, but is above the lowered pressure roller. Thus, the carrier belt is bent relatively sharply about the pressure roller to thereby facilitate separation of the belt from the relatively stiff and inflexible composite tape as the head moves toward the second boundary 188 in lay mode, as indicated by arrow 190 in FIG. 3. Clamp 174 (FIG. 5) on carriage 155 at the take up end of the gantry now grasps the carrier belt, and the tape head in lay mode is driven to the left to press the tape against the work surface at a pressure area. This pressure area moves toward second boundary 188 as the tape head moves toward the left, as viewed in the drawings. As the tape head moves toward the second boundary, pressing the tape upon the pattern on the work surface, the raised lifting roller continues to lift the carrier belt and separate it from the composite tape.

This motion continues until the trailing edge of the composite tape is pressed to the work surface at the second boundary 188. Then the tape laying head is moved to its pull mode (FIG. 6) in which the carrier belt (but not the composite tape) is clamped in the tape head, and both rollers are raised to lift the assembly of carrier belt and leading edge of the next tape strip. The tape head is then moved back toward the first boundary, pulling the belt and tape, and the gantry is shifted laterally to the next tape laying position. Thus, the belt and tape are first pulled out and stretched entirely across the area of the work surface to be covered by the tape, with the opposite ends of the tape (if pre-cut) positioned at the pattern boundaries. After so stretching and positioning the tape strip, it is progressively laid upon and pressed against the work surface pattern.

TAPE HEAD STRUCTURE

Opposite ends of an endless driving chain 200 (FIG. 9) are connected to a carriage 202 that carries the tape laying head and rides in tracks in the gantry 154. Chain 200 is driven through a gear box and sprocket 204 (FIG. 5) from a motor 206 in a manner similar to the motor gear box and drive for the gantry end carriages.

In order to ensure precision positioning, direction and steering of the tape as it is being laid, the tape laying carriage carries a vacuum tensioning shoe 208 mounted on an arm 210 carried by the carriage and having a vacuum line 212 connected thereto and leading back to a vacuum source (not shown). It will be noted that the tape and carrier belt are drawn from and to the supply and take up reels (see FIG. 5) at points well above the surface of the worktable so that when the tape is being laid and the pressure roller presses the tape against the table, both the belt, and the combination belt and tape strip, extend from the point of pressure contact of the pressure roller upwardly toward the take up reel and toward the supply reel. The upward inclination of the tape and belt portion between the tpe laying head and the supply reel allows the tension shoe 208 to firmly grasp the belt and tape and to tension the belt and tape between the pressure roller and a point ahead of the pressure roller motion. Because the tension shoe is securely mounted to the tape laying carriage, and the latter is precisely guided by the gantry track, the tension shoe will precisely position the tape to be laid. The tape that is immediately ahead of the pressure roller, that is, the portion of the tape that is just about to be laid, is stretched ahead of the roller in the proper direction and, accordingly, precisely steered along the laying path.

Figure 9:
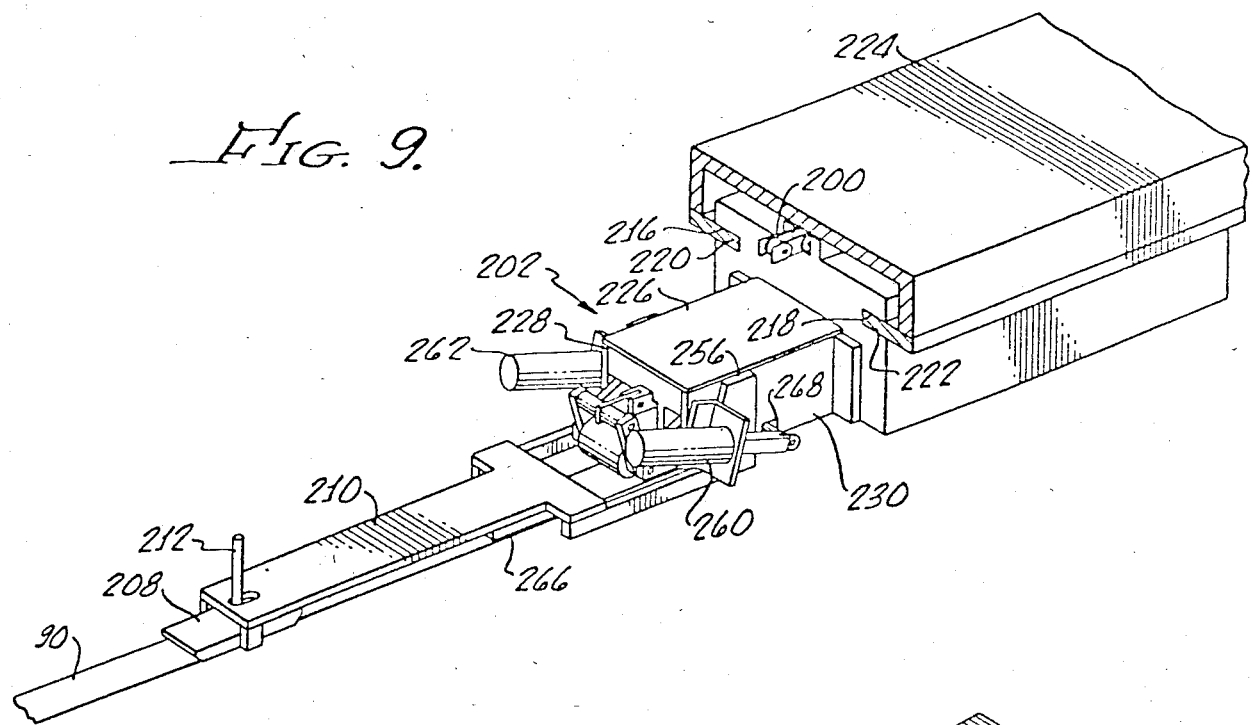
FIGS. 9 and 10 show further details of the tape laying head structure.
Figure 10:
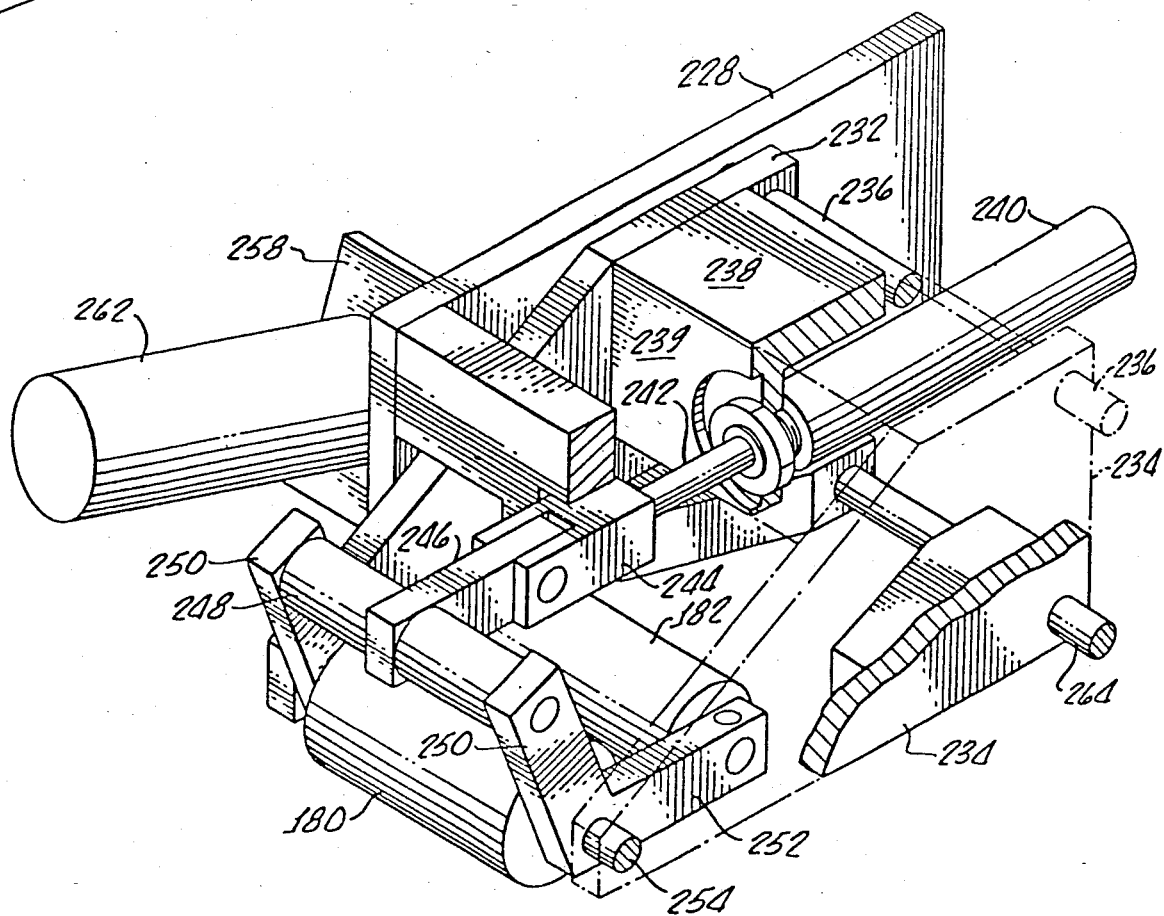

As best seen in FIGS. 9 and 10, the tape head carriage 202 is formed with a pair of laterally disposed longitudinally extending guide slots 216, 218 slideably receiving legs 220, 222 of the generally C-shaped track 224 of the gantry. Endless chain 200 is fixedly connected at one end to one end of the carriage and at its other end to the other end of the carriage. A tape head housing comprising top and side walls 226, 228 and 230 is fixedly mounted to the carriage and rotatably carries a pair of tape laying pressure plates 232, 234 mounted for pivotal motion about a shaft 236 carried by the housing sides 228, 230. Plates 232 and 234 are fixedly interconnected by an L-shaped cross bar 238, having a depending vertical leg 239 that carries an air cylinder 240 having a shaft 242. The cylinder shaft is connected to a yoke 244 that is pinned to an arm 246 which in turn is pivoted to a cross bar 248. Cross bar 248 extends between and is fixed to upper ends of each of a pair of spaced bell crank levers, each including arms 250 and 252.

Lower arms 252 of the bell cranks rotatably mount tape lifting roller 182. The two bell cranks are pivotally mounted on a pivot shaft 254 carried by the pressure plates 232, 234. Shaft 254 also rotatably mounts the pressure roller 180. Side walls 228, 230 carry fixed brackets 256, 258 that fixedly mount pressure roller air cylinders 260, 262 on opposite sides of the tape head. The air cylinder pistons are pivotally connected to a transverse drive rod 264 extending through relatively large apertures 268 in the side walls 228, 230 and mounted in the pressure plates 232, 234.

Accordingly, it will be seen that simultaneous operation of air cylinders 260, 262 will pivot the pressure plates 232, 234, together with all the structure supported thereon (including both rollers 180 and 182) about the pressure plate pivot shaft 236 so as to raise or lower the pressure roller 180, bell cranks 250, 252, and roller 182. Operation of air cylinder 240 will rotate the bell cranks 250, 252 about the pivot axis of shaft 254 to raise or lower the lifting roller 182 relative to the pressure roller 180.

If deemed necessary or desirable, a lateral guide shoe 266 is mounted to the underside of vacuum tension head support arm 210 at a point considerably closer to the pressure roller 180 so as to help steer the tape ahead of the pressure roller and tape head motion.

The apparatus of FIGS. 4 and 5 is readily adapted to mount the supply and take up reels interchangeably on either of the gantry end carriages. Clamp 174 is also mountable on either carriage. Similarly, the tape laying head may be merely remounted at 180 degrees to its illustrated position for laying tape from a supply reel positioned on the right side of the machine.

The tape laying apparatus illustrated in FIGS. 4 through 10, has a number of advantages as compared with prior art integral tape laying heads. The head is considerably smaller, lighter in weight, and easier to maneuver, drive, guide and align. The tape can be inspected before it is laid down, after pulling it out and stretching it across the work area, so as to avoid the laying down of possibly damaged or unacceptable tape which then must be removed. Improved tension control is also provided.

The vacuum tension shoe 208 that is affixed to and ahead of the tape laying carriage, not only ensures proper tension of a portion of the tape ahead of the pressure roller, but in addition, ensures that the tape is positioned close to and at the proper relatively small angle with respect to the work surface. The tension head will maintain this angle of inclination of the portion of the tape ahead of the pressure roller at a fixed value as the tape laying head progresses along its laying path. Because the supply roll is above the work surface, the tape and belt extend at an angle from the supply roll to the point of pressure. This angle will increase as the pressure roller moves toward the supply roll. The provision of the tension roller will avoid this change in angle at the pressure head and, moreover, will hold the tape ahead of the pressure roller at a fixed distance closer to the work surface. The vacuum tension shoe 208 may be caused to apply tension to the belt and tape merely by using the bi-directional drive of the supply reel to tension the entire length of tape after the pressure roller has been dropped to press the tape against the work surface, thereafter causing the tension shoe to grasp the tape and then slightly releasing the tension applied by the supply reel. The low mass, light-weight, curved springs at the supply and take up reels, permit increased speed of operation so that the tape and belt can be started and stopped more rapidly without imposing excessive acceleration and deceleration forces on the tape. The springs will absorb such excessive forces upon sudden starting or stopping of the tape and will help at all times to maintain tension on the tape and belt so as to enable proper psoitioning as the tape and belt are stretched across the worktable.

The described tape pull out and laying machine can readily be adapted for laying of pre-cut strips of tape on a surface so contoured in two directions so as to require slippage of tape fibers relative to one another (particularly if the tape fibers extend longitudinally of the tape, rather than transversely or obliquely) as the tape is laid down. Preferably, for such a contouring operation, the tape is first stretched entirely across the workpiece with both its pre-cut ends positioned at opposite boundaries of the path along which the tape is to be laid. Pressure areas, for laying upon compound curvature surfaces, are preferably applied from the center of the stretched tape strip outwardly toward opposite ends. Therefore, both tape and belt will be entirely below both rollers of the tape laying head. In fact, lifting roller 182 need not be used at all for laying such a pre-cut tape on a compound curvature contoured surface. (The carrier belt may be removed from a laid strip of tape after the tape strip has been cut and laid.) After the tape has been positioned and stretched across the pattern, the pressure roller is lowered to press against the belt at the center or at a point near the center of the tape strip and then moved toward a first boundary to move the pressure area to one end of the tape. Thereafter, the pressure roller is moved back toward the center and the pressure area is then moved toward the other boundary. Moving the pressure roller from an intermediate point outwardly toward each end of the pre-cut tape strip significantly enhances the ability of the tape fibers to slip relative to one another. Thus, it is desirable to use pre-cut strips of tape mounted on a carrier belt for application of tape to a contoured surface as, for example, in laying the tape directly into a mold of compound curvature. The tape filaments, being inelastic, will stretch only a negligible amount and, thus, pre-cutting of both ends of a tape allows the several filaments to behave relatively independently of one another for longitudinal slippage as the tape strip is pressed downwardly from an intermediate point and outwardly in both directions toward both ends.

The tape laying head disclosed herein accommodate a certain amount of elevation change of the work surface, such as will be encountered in laying tape upon a curved surface. Additional elevation change and, also, lateral, and one or more degrees of pivotal head displacement for laying tape along a curved path may be readily handled by connecting the housing 226, 228, 230, and the parts supported thereby, to the carriage 224 for continuous vertical, transverse, and pivotal adjustment under control of suitably programmed motors. Such transverse adjustment also may be used for fine lateral positioning of the tape head or for shifting the tape head to lay several narrow strips without moving the reel carriages laterally.

Figure 11:
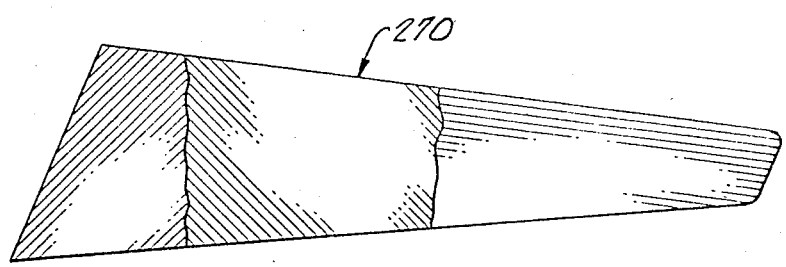
FIG. 11 illustrates an exemplary long and narrow part to be made of laminations of composite tape.

INDEPENDENT REELS AND TAPE HEAD

Where very large parts are to be manufactured of composite tape layers, machines of the type shown in FIGS. 4 and 5 will require a long gantry so as to enable a tape strip to be laid along the longest dimension of a part. For a long narrow part such as, for example, an airplane wing 270 of the general configuration illustrated in FIG. 11, tape strips may be laid at varying oblique angles, but may also be laid along the length, which is the maximum dimension of the part. An airplane wing, and other long narrow structures, that may be desirably fabricated of composite tape may be as much as one hundred feet or more in length. Because the tape laying machine must be capable of laying tape along tape paths extending across the part in all directions, the gantry of a machine that spans the part must be longer than the part length. The great length of such a machine is needed only when laying tape strips along the maximum dimension of the part, but is not needed when laying strips along transverse or oblique paths. Nevertheless, even for such transverse paths, the great length of the gantry which is needed for longitudinal tape paths, requires excessive amounts of floor space in directions transverse to the maximum dimension of the long narrow part. Thus, a machine requiring a gantry is not feasible for parts having very large dimensions in one or more directions.

Illustrated in FIG. 12 is a system that eliminates many of such problems encountered in the layup of long narrow parts. The machine requires a minimum of floor space commensurate with the size and shape of the part and entirely avoids the problem of a gantry of excessive length. As illustrated in FIG. 12, a long narrow work table 280 has a configuration generally similar to the configuration of a part that is to be laid upon the table surface or within a mold carried by the table. Obviously the size and shape of the table may be varied as deemed necessary or desirable, according to the size and shape of the part, and the particular table shape illustrated is chosen merely for purposes of exposition. The part (and table) may be very large in only one direction or may be large in all directions. Completely surrounding the table and following closely along its periphery is a continuous track 282 that is fixedly mounted and supported upon the floor which also supports the work table 280. Preferably the track will have a configuration substantially the same as that of the table, both in plan and elevation, so that where the table may have an irregular shape for the manufacture of an irregular part, so too the track will have a similar irregular shape, closely following along the table sides, both horizontally and vertically.

Mounted upon the track 282 for motion completely around the track are a number of carriages, including: a supply reel carriage 284, a takeup reel carriage 386, and first and second tape pressure head carriages 288, 290. The supply reel and takeup reel carriages 284, 386 are substantially similar, both structurally and functionally, to the corresponding carriages 153, 155 of FIGS. 4 and 5 (and also to the carriage shown in FIG. 18) in that each mounts a supply or takeup reel 292, 294, a tensioning spring 296, 298, cutters 300, 302, and clamps 304, 306 all as previously described in connection with the machine of FIGS. 4 and 5. The supply and takeup reels are driven by motors 308 and 310, respectively.

A tape pressure head 312, which may be substantially identical to the tape pressure head shown in FIGS. 6 through 10, is carried by tape head carriage 288 so as to be capable of controlled positioning to a number of different orientations and positions in three dimensions relative to the supporting carriage 288. Thus, the tape head 312 is carried by an arm 314 that is mounted for rotation about an axis 316 at the end of a jib 318 which in turn is slideably mounted upon a column 320 rotatable about an axis 319. The column is slidably carried by carriage 288 for vertical motion. Accordingly, the tape head is connected to the carriage by means of a plurality of interconnected relatively movable arms to enable positioning of the tape head with diverse orientations and positions in three dimensions. Arm 314 is rotated by a motor 322 carried on jib 318. Jib 318 is driven to extend by varying amounts from column 320 by a motor 324 carried by the column. The column 320 is rotated about its axis by a motor 326 mounted on the carriage 288 and is driven in elevation relative to the carriage by a motor 328.

A similar tape laying head and movable arm structure is carried by the second tape head carriage 290 and includes a rotatable and vertically movable column 330 carrying a projectable jib arm 332, to the end of which is rotatably mounted an arm 334 that fixedly carries a second tape pressure head 336 which is identical to the other tape head previously described.

Each of the carriages is driven entirely around the track independently of each of the other carriages. For example, each carriage mounts a motor 340, 342, 344, and 346 that drives a gear mounted on the carriage and engaged with a set of teeth extending continuously around the track, whereby each carriage may be driven to any position around the entire periphery of the table independently of the motion of any other carriage, providing of course that no carriage can pass any other carriage.

Figure 13:
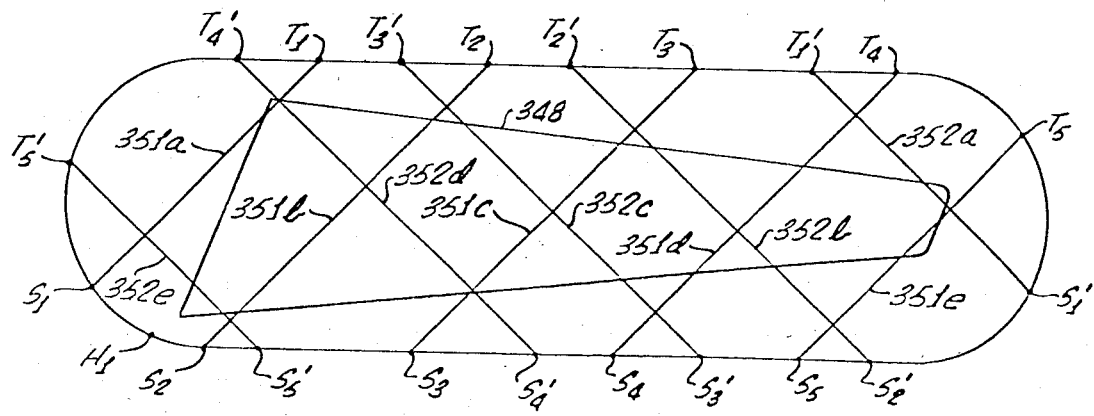
FIG. 13 illustrates a sequence of tape reel positions in laying tape with the apparatus of FIG. 12.

It will be seen that the reel receivers mounted on carriages 284 and 386, comprise two of the four working heads illustrated in the system of FIG. 12. These working heads may be positioned in mutual opposition across the table on lines extending at any and all possible orientations across the table. Therefore, tape may be laid upon the table along a tape path extending in any orientation. Application of tape along paths of any direction by the independent reel receivers and tape head is demonstrated by FIG. 13. FIG. 13 illustrates an exemplary part, generally shown at 348, mounted on a table surrounded by a continuous track indicated by the line 350. Assume that tape is to be laid across the part along oblique paths including the mutually parallel paths indicated at 351 $a-e$ (including parallel paths between these), and also along differently oriented oblique paths 352 $a-e$ (also including parallel paths between these). Tape laying may start along a path 351$a$ at the upper left hand corner of the part (as viewed in FIG. 13) for which path the carriage 284 (for the supply reel) will be positioned at the point $S_1$ (indicating a first position of the supply reel) and carriage 386 (for the takeup reel) will be positioned at a point $T_1$ (indicating a first position of the takeup reel), the two points being the points of intersection of the tape path 351$a$ with the track. With the reels in positions $S_1$ and $T_1$, tape head carriage 288 may be moved to a position such as $H_1$, for example, and a strip of tape stretched across the part between the two reels and laid by the tape head 312 in the same manner as described in connection with the stretching and laying of tape by the apparatus illustrated in FIGS. 4 and 5. In pulling out, stretching, and laying the tape, the tape head supporting arms, 314, 318, 320 and also carriage 288, if necessary, are all driven so as to cause the tape head 312 to move along the tape path 351$a$, maintaining its orientation along the path, to the positions and in the sequences relative to the tape path as previously described in connection with the apparatus of FIGS. 4 and 5. When the tape has been laid upon the first path 351a, the carriages 284 and 286 are moved to position them on opposite ends of the next adjacent parallel tape path and a tape strip is again laid upon the part 348. Tape head 288 is moved as necessary, although motion of the tape head carriage may not be required each time that tape is laid along a different path. Thus, the supply and takeup reels and their carriages are moved through various positions so as to cover the entire length of the part with the obliquely laid strips of tape, moving through positions indicated as $S_2$ through $S_5$ and $T_2$ through $T_5$. Of course, the reel receiver carriages are stopped at each adjacent parallel tape path (not only those shown on the drawing) and the tape head carriage and tape head are appropriately driven for laying tape along each such path.

To lay a lamination of side by side strips of tape along the paths 352 a–e, the reel receiver carriages are sequentially positioned at points indicated in FIG. 13 as $S_1'$, $T_1'$ through $S_5'$ and $T_5'$ and also at corresponding intermediate tape laying paths. Again, the tape head carriage and tape head are appropriately shifted for the laying of tape along each of the paths.

The mounting arms of the several tape heads are of a size to enable extension of the tape head from the tape carriage for a distance equal to the width of the table so that each tape head may be employed to lay tape along a line of any orientation in any position, including the opposite long side of the table. Thus, in the position illustrated in FIG. 12, where the reels are oriented for laying a longitudinally extending tape strip, the tape head carriage 288 is positioned on a relatively long side of the track and will move along the length of the track in laying of tape on one path. For laying tape transversly across the table, the tape head carriage need not be positioned at the far end of the track but may be positioned on a long side of the track a relatively short distance to one side of the desired tape path. The movable tape head supporting arms are controlled so as to drive the tape head transversely across the table, maintaining the proper positioning and orientation of the tape head by a combination of motions of the several tape head supporting arms and motion of the carriage along the track.

Where a second tape carriage and tape head are provided, as illustrated in FIG. 12, each tape head is not required to be capable of extension entirely across the table. In such a situation, each set of tape head supporting arms need be capable of positioning its tape head at a position slightly beyond the center of the table so that the two tape heads can act conjointly to lay a single strip of tape upon the table (in a short or transverse path). The tape head of carriage 288, on one long side of the table for example, operates on portions of a transverse tape strip between the center of the table and the carriage 288, whereas tape head 336, on the opposite long side, operates upon portions of the same tape strip closer to the side of the track upon which carriage 290 is positioned. Furthermore, the two tape heads may be employed in the manner previously described for laying a pre-cut length of tape in a compound curved mold, starting the pressing of the tape onto the surface of the mold from the center of the strip toward each end. Thus, tape head 312 may first press an intermediate point of such a strip down upon the table surface, and then move toward the supply reel end of such strip.

Thereafter, or before the first tape head has completed its ren, tape head 336 may move to press the intermediate point of the same tape strip and then move toward the takeup reel end of the same strip. Where two tape heads operate conjointly on the same strips of tape, the lifting roller is not employed and the carrier belt is separated from a tape strip after the strip has been laid.

Structure of the connecting arms that support the tape head from the tape carriage provide for increased vertical travel of the tape head and thereby facilitate use in laying tape in compound curvature molds or upon other surfaces having varying elevations.

Illustrated in FIG. 14 is a system substantially like that of FIG. 12, but having a different configuration of interconnected arms mounting the tape heads to their respective carriages. All of the parts of this system, including the track, and the several carriages for tape heads and reel receivers, excepting only the interconnected tape head supporting arms, are the same as described in connection with FIG. 12. In the arrangement of FIG. 14, a first tape head 360 is carried upon a first tape head carriage 362 by an articulated arm comprising a first column 364 mounted for rotation about a vertical axis (as viewed in FIG. 14) upon carriage 362. First and second pivoted links 366, 368, are pivotally connected to column 364 and to each other upon generally parallel and horizontal axes 370, 372. An arm 374 is pivoted about an axis 376 to the outer end of link 368 and carries the tape head 360 for rotation about an axis 378 extending axially of the arm 374. Individual motors 380 through 385 are provided to drive the various links of the articulated arm independently about all five of its rotary axes, and also to independently drive the carriage 362. Motor 380 rotates arm 364, motor 381 rotates arm 366, motor 382 rotates arm 368, motor 383 rotates arm 374, motor 384 rotates head 360, and motor 385 drives the carriage 362. Thus, the head 360 is mounted with five degrees of rotary motion and one degree of linear motion. As previously described, the linear motion of the head is completely around the entire length of the continuous track. The second tape head 387, which may be identical to the tape head 360 and to the other tape heads previously described, is carried on its tape head carriage 388 by means of an articulated arm structure identical to that mounting the tape head 360. The two tape heads each may be operated just as the tape heads 312 and 336 of FIG. 12.

The several carriages are preferably guided around the table on the illustrated continuous track. Two or more of such tracks may be provided, each mounting one or more of the carriages to allow carriages to pass one another and to increase the flexibility of relative positioning. It is also contemplated that one or more of the carriages may be mounted for motion about the table without any track. Such carriage will have its own wheels and move along the floor or other support adjacent the table. The carriages may be remotely controlled and positioned, as for example, by electrically conductive guide wires or magnetic devices.

If deemed necessary or desirable, a fifth carriage (not shown) may carry a scanning mechanism and/or a cutter on a similar set of movable arms arranged to enable the scanning mechanism to traverse a length of tape that has been stretched across a tape path but not yet pressed down and adhered to the work surface. For use of such a scanning mechanism, the tape backing paper or carrier belt on which the composite fiber tape is mounted may be made of a transparent material such as a mylar strip, for example, to enable a visible, manual inspection or an automatic laser-scanning inspection, from a position above the tape and its backing strip.

A cutter mounted on a fifth set of movable arms and carriage may be employed to trim edges of a lamination after all of its strips are laid. Such a cutter is particularly useful where the tape strips all are cut at right angles to the tape length but laid along paths that are oblique to the part edges, leaving a stair-step edge configuration of the lamination edge. Such a cutter may also be mounted on one of the previously described tape head structures so as to enable the cutter to be raised to an inoperable position when laying tape and to enable the tape roller to be raised to an inoperable position while the cutter is lowered to cut the part edges. Thus, as depicted in FIG. 15, tape head 390, otherwise identical to the tape heads previously described, carries a cutter blade 392 mounted on a lever 394 pivoted to the tape head housing at 396. The blade is driven between the illustrated cutting position and a raised inoperable position by an air motor 398 and urged toward the work table 184, when in cutting position, by a spring 400.

The articulated arm arrangement of FIG. 14 will inherently accommodate significant elevational differences along the length of any one or group of tape paths, and thus greatly facilitates the laying of tape upon parts having significant differences in elevation.

MODIFIED TAPE LAYING HEAD CONSTRUCTION

Figure 16:
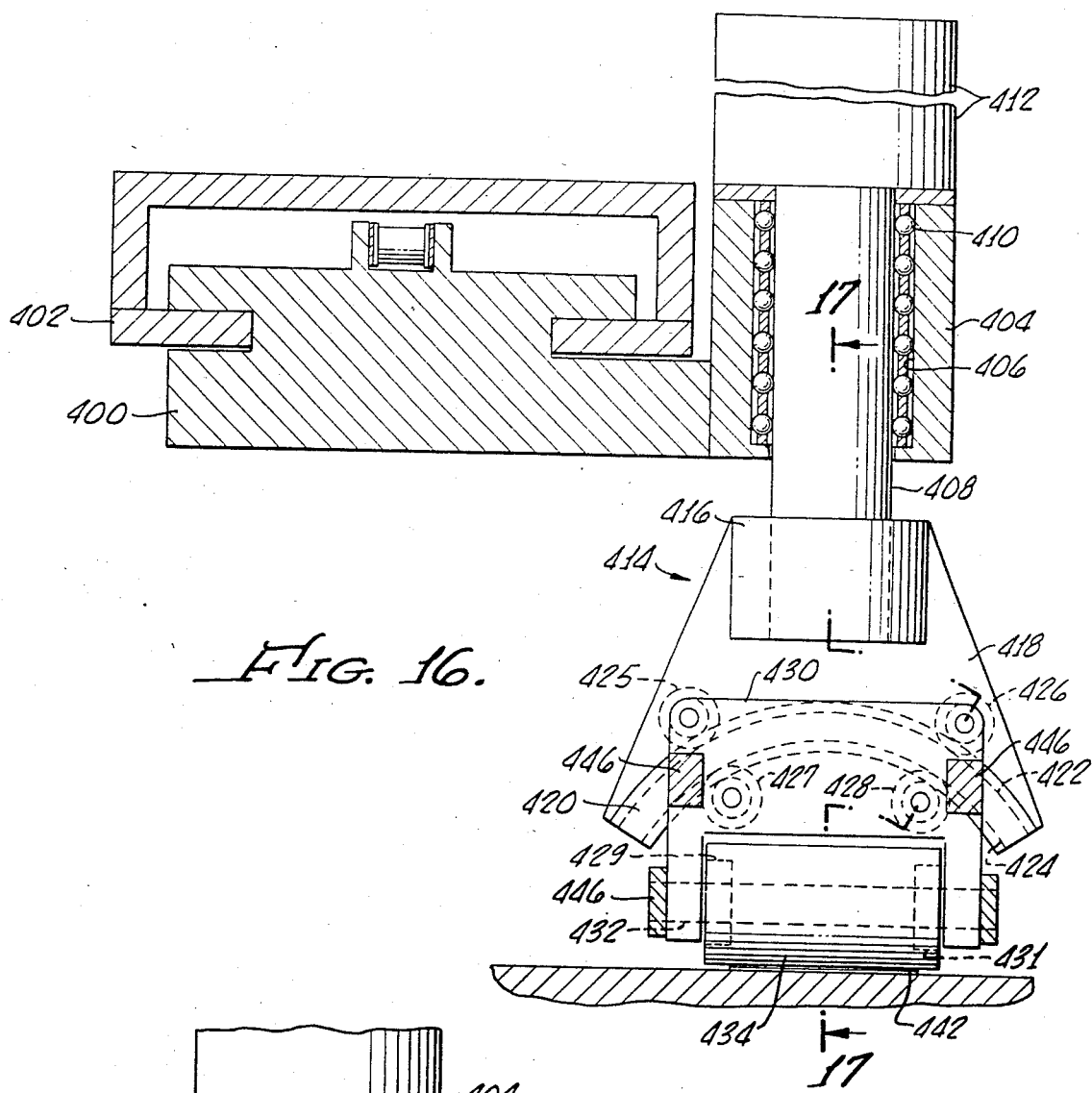
FIGS. 16 and 17 show a modified tape laying head.
Figure 17:
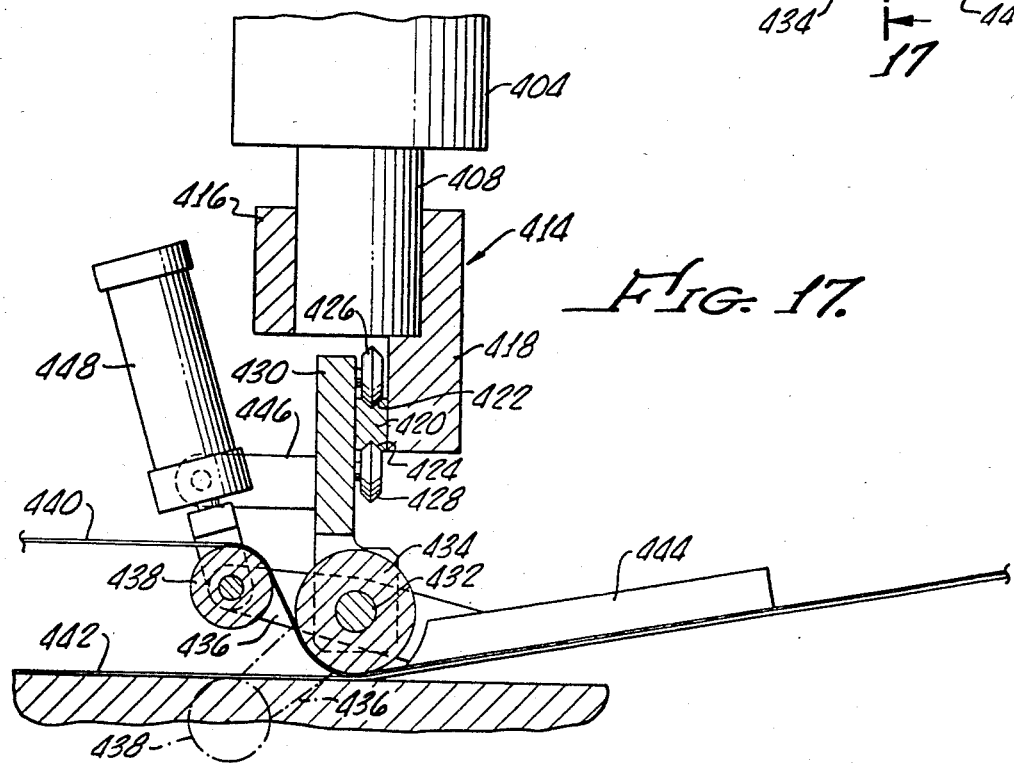

Shown in FIGS. 16 and 17 is a tape pressure head construction that is particularly arranged for applying composite tape to contoured surfaces, such as the concave and convex surface of a mold. It is especially suited for the machines shown in FIGS. 4, 12, and 14 wherein the tape reels are separated from the tape application head. A tape carriage 400 runs along a gantry track 402 which may be identical to the track 224 of FIGS. 9 and 10 in both structure and function. In this case, the tape head, instead of being carried in front of or below the carriage, is mounted alongside the carriage to allow for increased vertical motion. Thus, a vertical housing 404 is fixedly attached to the side of the carriage and includes a bore 406 in which is mounted a vertically slideable shaft 408 which is also rotatable about its longitudinal axis. A series of guide bearings or bushings 410 is interposed between the shaft and the vertical housing, to facilitate its axial and rotational motion. The shaft is moved between an upper inoperable and lower tape laying position by means of an air motor 412 mounted on the housing 404 and driving the upper end of the shaft 408 downwardly and upwardly as the motor is actuated. If more than two vertical positions are desired, the shaft is positioned by a DC motor driven lead screw or similar continuously adjustable drive.

Fixed to the lower end of the shaft is a tilt member 414, having an upper mounting block 416 fixed to the shaft end and fixedly carrying a depending plate 418 to which is fixedly mounted an arcuate guide bar 420 having arcuate V-shaped grooves or tracks 422, 424 formed in its upper and lower surfaces.

The V-shaped tracks 422, 424 mount and guide upper guide rollers 425, 426, and lower guide rollers 427 and 428 journaled on a roller support plate 430 which carries at its lower end a pin 432 upon which a tape pressing roller 434 is journaled by bearings 429 and 431. Pivotally mounted upon the pin 432 is a release roller arm 436 carrying at one end a release roller 438 which functions just as the lifting roller 182 of FIGS. 6 through 8 to lift the belt or paper backing 440 from the composite tape 442 as the tape head moves in its tape laying motion (toward the right as seen in FIG. 17). A vacuum shoe 444 is carried at the other end of the release roller arm 436, positioned ahead of the pressure roller 434 to guide and tension the tape ahead of the roller.

A bracket 446, fixed to the support plate 430, pivotally carries an air cylinder 448 having a driven shaft pivoted to the release roller arm 436. Air cylinder 448 is operable to pivot the arm 436 between an upper or tape laying position, illustrated in solid lines FIG. 17, and a lower or pass-mode position illustrated in dotted lines. In the latter position, the vacuum shoe 444 is raised. If deemed necessary or desirable, a clamping block (not shown) may be carried by the support plate 430 to cooperate with the release roller 438 in its upper position to enable the combined tape and carrier belt backing to be pulled from the supply reel. Alternatively, and in the absence of such a clamp block, the tape and carrier belt may be pulled from the supply reel by driving the takeup reel.

The flexible tape laying head illustrated in FIGS. 16 and 17 may be utilized with any of the tape laying machines shown in FIGS. 4 and 5, 12 and 14, being readily mountable upon any of the illustrated tape laying carriages.

If the tape is relatively wide and tensioned sufficiently between supply and takeup reels, the side guides of the vacuum shoe may adequately align the tape head along the tape path and, accordingly, the tape head may be free to swivel about the axis of shaft 408 to follow the tape. Alternatively, a motor (not shown) may be mounted on the housing 404 to rotate the tilt member and pressure roller 434 a full one hundred eighty degrees or more. The swivel member and pressure roller and rotatable to two opposite one hundred eighty degree positions to enable tape laying from a supply reel on either end of the tape path. The shaft 408 may be castered, that is, tilted rearwardly and downwardly, to enhance the ability of the swiveling pressure roller to track the tape as the latter is being laid. The tilting motion of the pressure roller, provided by arcuate guide bar 420 and rollers 425 through 428, allows the roller to follow a curved or tilted surface.

REEL AND CARRIAGE MOUNTING

Illustrated in FIG. 18 are details of the construction of a typical carriage and a swiveled reel receiver mounted thereon. A machine foundation 530 carries a continuous and endless track 532 which is fixedly secured to the foundation 530 and includes a continuous upstanding vertical rail 534. The track is identical in function and is substantially identical structurally to the track 282 illustrated in FIGS. 12 and 14. Upper and lower guideways 536, 538 are fixedly mounted on the track and slidably receive and guide two sets of mutually spaced carriage mounted rollers, of which only one set, comprising rollers 539, 540, 541, and 542, is shown. The carriage rollers 539 through 542, are mounted on a substantially inverted J-shaped carriage 544 carrying a carriage position drive motor 546 having a driving gear 548 that meshes with a continuous toothed rack 550 fixedly mounted on an upper end of the track adjacent guideway 536. The carriage is driven to any desired position along the rail by motor 546, gear 548, and toothed rack 550 and is guided in its motion along the track by the several rollers 539 through 542.

A capstan 552 is mounted upon an upper end of the carriage 544 for 360° of rotation on bearings 554. A reel receiver direction drive motor 556 is mounted on the carriage and has a driven gear 558 that meshes with teeth on the inner side of a ring gear 560 that is fixedly attached to the capstan, whereby operation of the motor 556 will rotate the capstan about a vertical axis (in a system oriented as illustrated) to any desired angular position. Fixed to and upstanding from the capstan is a vertically extending yoke 562 that detachably receives and journals a tape reel 564 which may be either the supply or takeup reel. The yoke mounts a reel rotation drive motor 566 and a gear box 568 connected to rotate the reel in either direction. A curved tape tension spring 570 is fixed at its lower end to the rotary capstan and extends upwardly, outwardly (rearwardly, away from the work table), and then inwardly toward the reel hub to a curved free end 572 over which tape drawn from the reel is guided. The tape, together with its carrier belt if the reel is a supply reel, or the carrier belt alone if the reel is a takeup reel, extends around the tension spring 570 past a lineal measuring unit 576 carried by the rotary capstan, thence across the capstan and through a shear unit or cutter 578. The cutter 578 includes a cutter backup block 580 fixedly mounted above the tape upon a radially projecting cutter support flange 582 carried by the rotary capstan 552. A cutter arm 584 carries a blade 586 and is pivoted to the fixed cutter block 580 on a pivot axis 588. Mounted on cutter support flange 582 is a shear actuation air cylinder or solenoid 590 driving a shear actuator 592 that is pivotally connected to the cutter arm 582 on an axis 594. A stop (not shown) may be employed to limit blade travel so as to cause it to cut the tape but not the carrier belt.

The illustrated carriage may mount either of the tape reel receivers, and the very same structure may be employed for the tape head carriages. Thus either the slidable and rotatable jib arm structure of the tape head support of FIG. 12 or the articulated arm structure of the tape head support of FIG. 14 may be mounted on the carriage illustrated in FIG. 18.

Although a reel direction drive motor 556 is shown for the purpose of aligning the reel along the length of the tape path over which the tape is to be stretched, it will be readily appreciated that such motor and its gear drive may be omitted so that the takeup and supply reels will be freely rotatable on the carriage and mutually aligned with each other and along the tape path by the forces exerted by a length of tape and carrier belt stretched and tensioned between the reels. The greater the width of the tape employed, the greater the alignment forces exerted by the tape and the less the need for a reel direction drive motor. For example, for tape strips of one inch in width, it may be preferred to employ the reel direction drive motor to precisely control reel orientation, whereas when using a tape of a width of six inches or more, the reel direction drive motor and its gear connection to the capstan may be omitted and the reels allowed to freely swivel on the rotary capstans to be aligned by the forces exerted by the relatively wide and tensioned tape stretched between the reels.

It will be appreciated that the described tape laying apparatus and methods, and in particular the arrangements illustrated in FIGS. 12 and 14, have a number of features and advantages comprising significant improvement over machines previously known. These advantages and improvements include the following: The tape and its carrier belt are stretched over the part or die before laying. Two or more pressure heads may be employed. The tape pressure heads are separately mounted and separately movable with respect to the tape reels. The tape pressure heads and the tape reels can move completely around the table for longitudinal, bias, or cross-ply tape laying paths. The tape laying head can start laying and pressing the tape at a midpoint and work out toward the ends, or may start at the ends and work toward the middle, or may operate in any combination of such motions. The system will readily accommodate varying elevations of a work surface, both concave and convex. The system will readily work with preassembled and pre-cut strips of tape. It may be operated in orientations of the machine other than the horizontal orientation illustrated in the drawings, and the vacuum head provides proper tape tensioning, positioning, and alignment as the tape is laid.

It will be understood that the apparatus of FIGS. 12 and 14, wherein a track completely circumscribes a work area and mounts two or more independently movable working ends, may be used in other types of systems, other than for laying composite tape, where two opposed working heads must be positioned upon or mutually aligned along lines of any and all directions extending across the work area.

Although the various motors for driving the several parts of the tape laying machine can be operated individually, independently, and manually if necessary or desirable, it will be readily appreciated that a suitably programmed digital computer may be employed to send out the appropriate signals in the desired sequence for controlling operation of the various motors and drives. Conventional position sensors, such as shaft position encoders and photoelectric devices may be employed for monitoring and control of position, as well known to those skilled in the art.

The foregoing detailed description is to be clearly understood as given by way of illustration and example only, the spirit and scope of this invention being limited solely by the appended claims.

What is claimed is:

1. The method of laying composite tape between boundaries defining an area of a work surface that is to be covered with a plurality of strips of tape comprising
    stretching a strip of tape between a first boundary and a second boundary adjacent said work surface with one end of said strip at said first boundary,
    pressing said strip against said surface at a pressure area of said tape strip,
    moving said pressure area along said tape strip across said work surface area while holding said tape strip stretched across and adjacent said work surface area, said tape being mounted on a carrier belt and wound on a supply reel mechanism,
    mounting the supply reel mechanism and a belt take-up mechanism beyond said first and second boundaries, said steps of pressing said strips comprising mounting a tape pressure head adjacent said work surface, and
    moving said supply and take-up mechanisms independently of said pressure head around the boundaries of said work surface area to define tape paths between the mechanisms that extend at all orientations across the work surface so that the carrier belt and a tape strip may be stretched between the mechanisms across said work surface area in any orientation.

2. The method of claim 1 including the step of moving said tape pressure head around the boundaries of said work surface independently of motion of said mechanisms.

3. The method of claim 2 wherein the step of moving said mechanisms and pressure head around the boundaries of said work surface include the steps of mounting a track extending along and completely around said boundaries, and wherein said steps of moving said supply and take-up mechanisms and pressure head comprise driving said mechanisms and pressure head along said track.

4. The method of claim 1 including precutting strips of tape, mounting the cut strips on a carrier belt, winding the belt and cut strips on said supply reel mechanism, said step of stretching a strip of tape including passing a secion of said carrier belt from said supply reel mechanism to said take-up mechanism across said work surface area and across first and second boundaries adjacent said work surface.

5. The method of claim 4 wherein said pressing of said strip comprises pressing said belt toward said work surface with said tape interposed between the belt and work surface and concomitantly separating said belt from said strip of tape.

6. The method of claim 4 wherein said step of mounting cut strips comprises mounting the cut strips on the carrier belt in longitudinally spaced relation so that an end of one strip is spaced from an adjacent end of an adjoining strip, whereby when said strips are cut at an acute angle to their length said pressure area may be positioned at the end of one strip without extending over part of the adjacent end of the adjoining strip.

7. The method of claim 6 wherein said step of pressing and moving lays a first strip of tape along a first path on said work surface, and including the steps of stretching a second section of the carrier belt across the work surface area and beyond said first and second boundaries to position a second strip of tape on the belt along a path adjacent said first path, and repeating said steps of pressing and moving.

8. Apparatus for laying tape comprising
a work table,
first, second, and third carriages mounted adjacent said work table,
a supply reel receiver mounted on said first carriage and adapted to carry a reel of tape mounted upon a carrier belt,
a take-up mechanism mounted on said second carriage and adapted to receive a carrier belt withdrawn from a supply reel on said supply reel receiver,
said first and third carriages being mounted for mutually independent motion along said work table,
a pressure head mounted on said third carriage, said head including means for pressing said tape against said work table, and
means for driving said third carriage and said pressure head toward said first carriage and said supply reel receiver while pressing said tape against the work table.

9. The apparatus of claim 8 wherein said first and second carriages are mounted for motion relative to the work table independently of said third carriage.

10. The apparatus of claim 8 including a track extending completely around said work table, said carriages being mounted for mutually independent motion along said track.

11. The apparatus of claim 8 wherein said pressure head includes means for receiving and guiding a carrier belt past the head to said take-up reel receiver.

12. The apparatus of claim 8 including means for mounting said pressure head on said third carriage for motion in three dimensions and with varying orientations relative to said third carriage.

13. The apparatus of claim 8 including means on said head for tensioning the belt and tape ahead of said pressing means as the head is driven toward said one reel receiver.

14. The apparatus of claim 8 wherein said pressure head includes means for gripping said belt, and including means for driving said head to pull a section of the carrier belt and tape from a supply reel on said supply reel receiver.

15. The apparatus of claim 8 including a plurality of relatively movable mutually interconnected arms mounting said pressure head on said third carriage.

16. The apparatus of claim 15 wherein said arms comprise an articulated linkage.

17. The apparatus of claim 15 wherein said arms comprise an extensible beam rotatably mounted on said third carriage, said pressure head being mounted on said beam.

18. The apparatus of claim 8 including means on said head for separating said belt from said tape as the head is driven toward said one reel receiver.

19. The apparatus of claim 18 including means on said head for disabling said pressing means to allow the belt and tape to pass freely through the head, whereby the head can be driven along the belt toward said supply reel receiver to position the head for gripping and pulling said belt and tape from a supply reel on said supply reel receiver.

20. The apparatus of claim 8 wherein said head includes a head body mounted on said third carriage, a pressure plate, a pressure foot on said pressure plate, means for moving the pressure plate and pressure foot between a first position in which the foot is adapted to press a tape against a work surface and a second position in which the pressure foot is retracted, a belt raising member mounted on the pressure plate for movement between a first position in which the member passes freely along a belt extending through the head and a second positon in which the member is shifted relative to the pressure foot to displace a belt passing through the head so as to separate the belt from a tape.

21. The apparatus of claim 20 including a tension arm mounted on said head body and projecting from said body toward said one reel receiver, and a tensionsing shoe carried on said arm for tensioning a section of the belt and tape ahead of said head as it is driven toward said one reel receiver.

22. Apparatus for laying elongated strips of material comprising
a work table,
a material head including means for pressing material against said table,
means for mounting said material head for motion relative to said table,
a supply reel receiver adapted to carry a reel of material upon a carrier belt, means for mounting said supply reel receiver for motion relative to said table independently of motion of said material head, whereby said material head may be moved relative to said supply reel receiver while pressing material against said table, a take-up mechanism adapted to receive a carrier belt extending across said table from a supply reel on said supply reel receiver, and means for mounting said take-up mechanism for motion relative to said table independently of motion of said supply reel receiver.

23. The apparatus of claim 22 wherein said means for mounting said material head comprises a material head carriage, and means for driving said carriage relative to said table.

24. The apparatus of claim 23 wherein said means for mounting said supply reel receiver comprises receiver carriage means independent of said material head carriage, and means for driving said receiver carriage means relative to said table and relative to said material head carriage.

25. The apparatus of claim 22 wherein said means for mounting said supply reel receiver, said take-up mechanism, and said material head, respectively, comprise a supply reel carriage, a take-up carriage, a head carriage, and a track extending along at least a part of the periphery of said table, said carriages being mounted for motion along said track, and including means for pivotally mounting said supply reel receiver and said take-up mechanism to said carriages to enable alignment with each other along a tape laying path.

26. The apparatus of claim 25 wherein said track completely and continuously circumscribes said table.

27. The apparatus of claim 26 wherein said table is long and narrow, having a periphery with relatively long sides and relatively short ends, and wherein said track follows said table periphery.

28. The apparatus of claim 25 wherein said means for mounting said material head includes means for supporting the material head upon said material head carriage for pivotal motion, whereby the material head may follow a contoured surface.

29. The apparatus of claim 25 wherein said means for mounting said material head includes a plurality of relatively movable, mutually interconnected arms mounting said material pressing means to said tape material head carriage for motion relative to said material head carriage.

30. The apparatus of claim 29 including a second material head carriage mounted for motion along said track, a second material head including second means for pressing material against said table, and a plurality of relatively movable, mutually interconnected arms mounting said second material pressing means to said second material head carriage.

31. The apparatus of claim 29 wherein said arms comprise an articulated linkage.

32. The apparatus of claim 29 wherein said arms comprise an extensible beam rotatably mounted on said material head carriage, said material pressing means being mounted on said beam.

33. The apparatus of claim 32 including a second material head having means for pressing material against said table, and means for mounting said second material head for motion relative to said table independently of said motion of said receivers.

34. The apparatus of claim 22 including a cutter mounted on said material head for motion between a retracted position in which the cutter is displaced from said table and a cutting position in which the cutter is positioned to cut a plurality of material strips after such strips have been pressed against said table.

35. In combination, a work table, first and second carriages independently mounted on said track for mutually independent motion along the track, first and second working heads mounted on said first and second carriages, respectively, means for independently driving said carriages along said track to position said working heads in mutual opposition across said work table on a line extending at any orientation across said work table, and means for orienting said working heads for alignment with each other and with said one line.

36. The combination of claim 35 wherein one of said working heads includes a material supply reel, wherein the other of said working heads includes take up mechanism and further including a third carriage mounted on said track for motion along the track, a third working head mounted on said third carriage, and means for driving said third carriage along said track independently of said first and second carriages.

37. The combination of claim 36 wherein said supply reel carries a roll of tape, and including means for stretching tape from said supply reel in any orientation across said work table to said take-up mechanism said third working head comprising a tape pressure head for pressing against tape that is stretched across said work table.

* * * * *

UNITED STATES PATENT AND TRADEMARK OFFICE
CERTIFICATE OF CORRECTION

PATENT NO. : 4,588,466
DATED : May 13, 1986
INVENTOR(S) : Homer L. Eaton

It is certified that error appears in the above-identified patent and that said Letters Patent is hereby corrected as shown below:

Column 4, line 25, after "motor" and before "chain add a comma ---,---.

Claim 35 (column 20, line 24), after "a work table," add the following subparagraph ---a track extending completely around said work table,---.

Claim 36 (column 20, line 38), delete "take up" and substitute therefor ---a take-up---.

Claim 37 (column 20, line 47), after "mechanism" and before "said" add a comma ---,---.

Signed and Sealed this

Seventh Day of April, 1987

Attest:

DONALD J. QUIGG

Attesting Officer

Commissioner of Patents and Trademarks